No. 726,604. PATENTED APR. 28, 1903.
J. W. WILLIAMSON.
FLY TRAP.
APPLICATION FILED OCT. 31, 1902.
NO MODEL.

WITNESSES:
Edwin L. Yewell
R. H. Bishop

INVENTOR,
John W. Williamson,
BY Davis & Davis,
ATTORNEYS.

UNITED STATES PATENT OFFICE.

JOHN W. WILLIAMSON, OF LIBERTY, IOWA.

FLY-TRAP.

SPECIFICATION forming part of Letters Patent No. 726,604, dated April 28, 1903.

Application filed October 31, 1902. Serial No. 129,564. (No model.)

*To all whom it may concern:*

Be it known that I, JOHN W. WILLIAMSON, a citizen of the United States, and a resident of Liberty, county of Clarke, State of Iowa, have invented certain new and useful Improvements in Fly-Traps, of which the following is a specification, reference being had therein to the accompanying drawings, in which—

Figure 1:
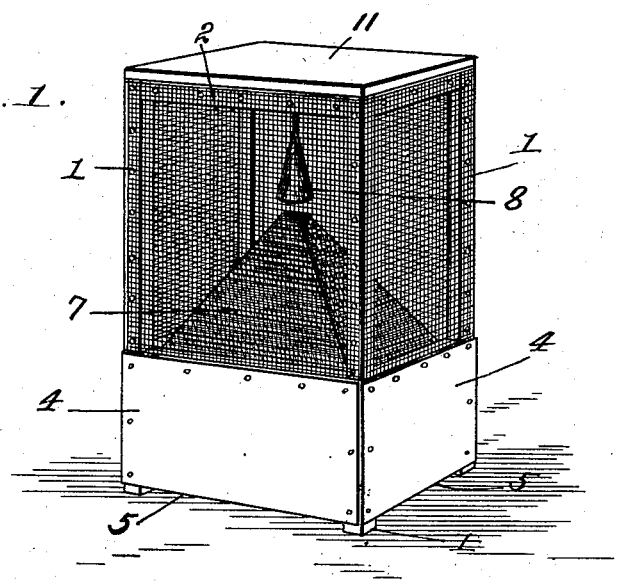
Figure 2:
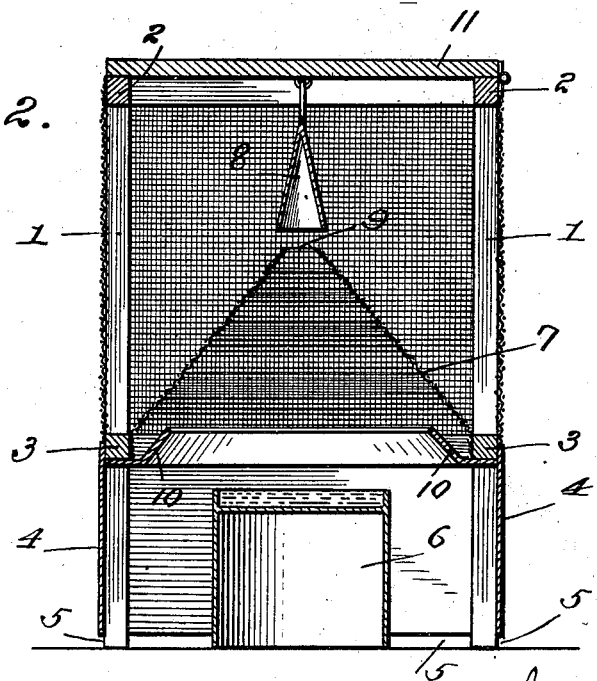

Figure 1 is a perspective view of the trap, and Fig. 2 a vertical transverse sectional view thereof.

One of the objects of this invention is to produce a fly-trap of simple construction which while permitting the flies and other insects to readily enter effectually prevents their escape therefrom.

Another object of the invention is to so construct said trap that it may be readily cleaned.

Referring to the various parts by numerals, 1 designates the corner uprights or posts of the frame of the trap, and 2 the horizontal cross-bars, which connect the upper ends of the uprights, and 3 the horizontal cross-bars, which connect said uprights near their lower ends, thus forming an open box-like frame. To the four sides of this frame, near the lower ends thereof, are secured imperforate side sections or blinds 4, the upper edge of these imperforate sections being flush with the upper surface of the lower cross-bars 3 and the lower edges thereof being slightly above the lower ends of the vertical posts 1. The purpose of thus arranging the blinds slightly above the lower ends of the vertical posts is to provide entrance-ways 5 for the insects when the trap is supported on a table or other platform, the lower portions of the posts 1 forming the legs by which the trap is supported. These blinds form a bait-compartment, which because of the imperforate sides, is darker than the main compartment or cage. The four vertical sides of the trap between the upper and lower cross-bars are formed of wire-screen sections 6 of suitable fineness. It is obvious, however, that these sides of the frame may be covered by any suitable foraminous material. Within the frame with its base resting on the lower cross-bars is a pyramidal screen or inverted funnel 7, whose walls incline upward and inward from the lower cross-bars, the upper end of this screen being open to permit the flies and other insects to pass into the main compartment of the trap. Above the open end of this pyramidal screen is a hollow cone 8, whose lower open end is a short distance above the open end 9 of the screen 7.

Secured to the lower cross-bars 3 are troughs 10, whose walls extend inward and upward, the upper edges of the walls of said trough being about on a level with the upper surface of the lower cross-bars and extending a short distance into the screen 7.

A bait-receptacle 6 is placed within the bait-compartment of the trap, the upper edge of said receptacle being slightly below the bottom of the troughs 10. This bait-receptacle is supported on the platform on which the trap is placed and is not in any way permanently connected to the trap proper, although it may be so connected, if desired. The top of the trap is closed by an imperforate cover 11, which is hinged at one edge to one of the upper cross-bars, and from the upper side of this cover is suspended the hollow cone 8.

In operation the flies and other insects pass into the bait-compartment of the trap through the entrance-ways 5. This compartment is quite dark by reason of the imperforate blind-sections 4, and the insects after they have entered will naturally move upward to the light. They of course will also be attracted upward by the bait in the bait-receptacle. The walls of said receptacle extend up near to the bottom of the troughs 10 in order that the insects will be compelled to ascend to that point before they can reach the bait. In rising from the bait-receptacle the insects will naturally move upward to the light and will travel upward along the walls of the pyramidal screen until they pass through the open upper end thereof into the main compartment of the trap. Should any of the insects move downward along the walls of the pyramidal entrance-screen before they have entered the main compartment, they will enter the troughs 10 at the bottom of said screen and will by the inner walls of said trough be again directed upward. After the insects have once entered the main compartment of the trap it will be practically impossible for them to escape because of the hollow coneguard suspended directly over the opening at the top of the pyramidal entrance funnel or screen.

It will be thus seen that this fly and insect trap is of simple construction, efficient in operation, and that it may be readily cleaned.

Having thus described my invention, what I claim as new, and desire to secure by Letters Patent, is—

1. In a fly-trap, the combination of the main compartment having wire-gauze walls, a pyramidal entrance-screen within said compartment said screen being open at its upper end, the lower edge of said screen being secured to the bottom of the main compartment, a bait-compartment below the main compartment the walls of said bait-compartment being imperforate, entrance-ways to said bait-compartment below the imperforate walls thereof, a bait-receptacle in said bait-compartment the upper end of said bait-receptacle being slightly below the lower end of the pyramidal entrance-screen, a trough at the lower end of the entrance-screen, the inner walls of said trough extending upward and inward and terminating within the entrance-screen, and a hollow guard-cone suspended over the open upper end of the entrance-screen.

2. In a fly-trap, the combination of a main compartment with wire-gauze walls, an upward-tapering entrance-screen secured therein, said screen being open at its upper end, a hollow guard-cone suspended over the upper open end of said screen, a bait-compartment below the main compartment the walls of said bait-compartment being imperforate, entrance-ways into said bait-compartment at the lower edges of the walls thereof, and a bait-receptacle within said compartment.

In testimony whereof I hereunto affix my signature, in the presence of two witnesses, this 27th day of October, 1902.

JOHN W. WILLIAMSON.

Witnesses:
 WALTER C. MORRIS,
 WYANT LANE.